United States Patent

[11] 3,586,222

[72] Inventor Marvin Rosen
 Clark, N.J.
[21] Appl. No. 853,870
[22] Filed Aug. 28, 1969
[45] Patented June 22, 1971
[73] Assignee Air Reduction Company, Incorporated
 New York, N.Y.

[54] SPEED CONTROL SYSTEM FOR MULTIPLE MOTOR FEED OF WELDING WIRE
 13 Claims, 5 Drawing Figs.
[52] U.S. Cl................................................ 226/1,
 219/131, 226/42, 226/108, 226/188, 314/69
[51] Int. Cl................................................ B65h 23/22
[50] Field of Search........................................ 226/25, 42,
 1, 108, 188; 219/130, 131, 131 F; 314/69, 75

[56] References Cited
UNITED STATES PATENTS
3,293,477 12/1966 Lobosco.................. 226/188 X
3,443,145 5/1969 Margrain.................. 219/130 X Primary Examiner—Richard A. Schacher
Attorneys—Larry R. Cassett, Edmond W. Bopp and H. Hume Mathews ABSTRACT: A multiple servo synchronized speed control system for uniform push-pull feed of welding wire between a supply reel and a welding gun comprises a "pull" servomotor at the gun and a slaved "push" servomotor in tandem between the gun and reel for feeding the wire; a pull motor speed regulating amplifier having as input a wire speed reference signal, with velocity and load torque feedback signals from the pull motor; a push motor speed regulating amplifier having an input a slaving velocity signal from the pull motor and a velocity comprising signal from the push motor; both servomotors receiving respectively amplifier regulated power through time-ratio-control transistorized power switching, and having torque limiting overload control.

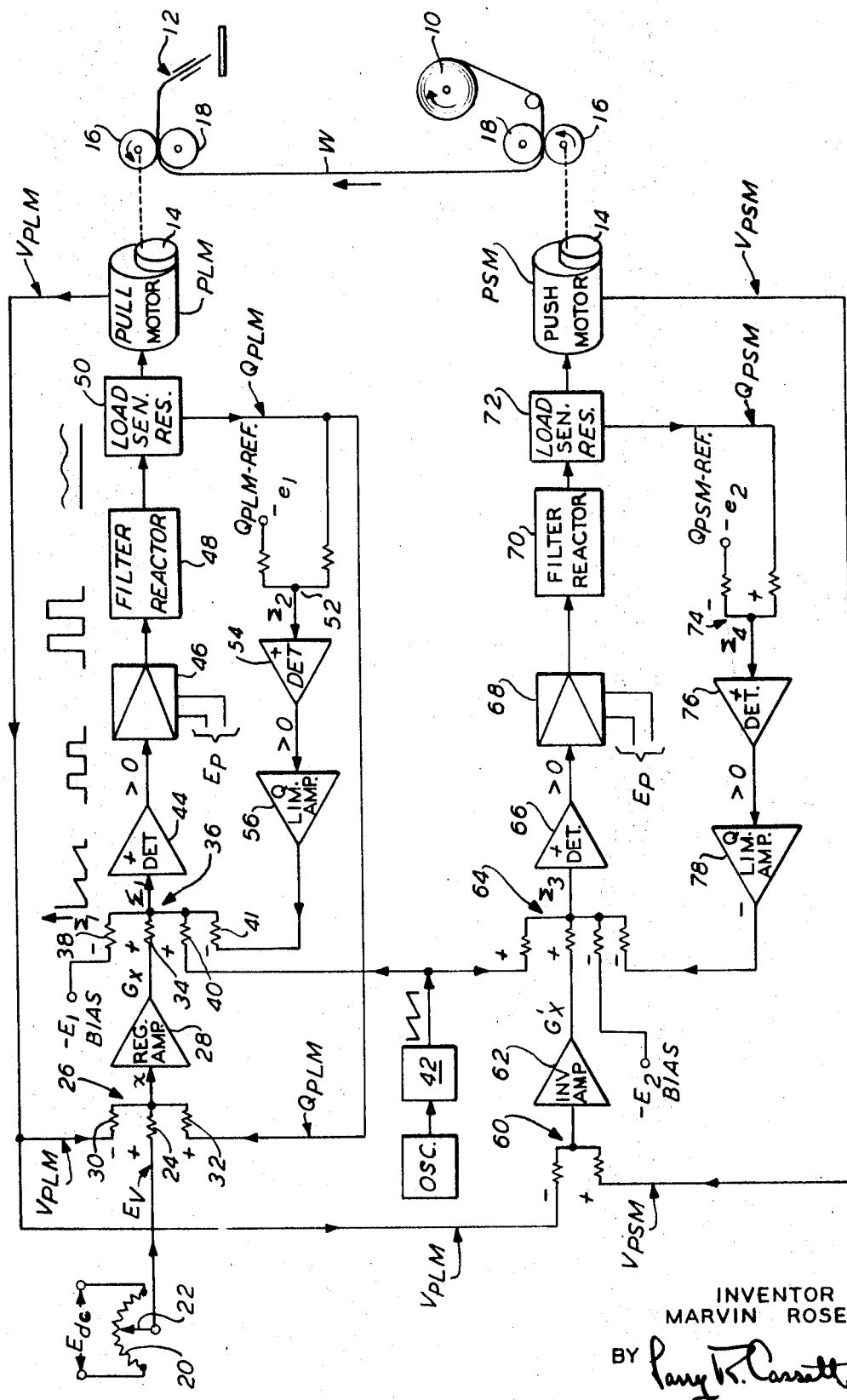

INVENTOR
MARVIN ROSEN

BY *Larry R. Cassett*
ATTORNEY

SPEED CONTROL SYSTEM FOR MULTIPLE MOTOR FEED OF WELDING WIRE

CROSS-REFERENCE TO RELATED APPLICATION

My copending application Ser. No. 853,871 filed Aug. 28, 1969 for "Torque Control of Multiple Motors for Uniform Feed of Welding Wire," and assigned to the same assignee as the present invention, discloses in part subject matter similar to that disclosed herein, and further discloses and claims a different control system for obtaining uniform wire feed.

BACKGROUND OF THE INVENTION

The feed of welding wire from a supply reel to a welding torch or gun is often accompanied by wire control problems, especially where the feed rate, wire length from reel to gun, weight of wire and other factors require that the feed load be divided between at least two servomotors located in tandem for push-pull operation along the wire. One servo, generally termed the "pull" motor, is located near or at the gun and its desired function is to establish and maintain a selected rate of wire feed; the other servo termed the "push" motor is located at a suitable point between the pull motor and reel and its desired function is to prevent buildup of excessive wire-pull tension produced by the pull motor, while drawing from the reel no more wire than is called for by the pull motor.

In practice, when the pull and push motors are operating properly, the wire tension is sufficient to prevent slack that could cause looping and kinking of the wire at normal feed rates, and is beneath a value that could cause undue stressing and stretching or breaking of the wire with resulting malfunction. Under ideal conditions, the wire is smoothly fed at uniform rate from reel to gun.

Heretofore such push-pull control has been difficult to achieve due to motor speed variations from a desired reference speed with improper division of the load between the motors. Such speed variations may be due to load changes, source voltage variations, individual motor characteristics, and other factors. Various methods have been proposed for ensuring uniform wire feed in such systems, such as by matching the motor characteristics, or by using a pull motor having a "drooping" speed-load characteristic, and a push motor having a constant speed-load characteristic, the purpose here being to allow the pull motor which has a no-load speed higher than the selected wire feed, to pick up the load as required. However, the prior art methods insofar as presently known, fail to compensate properly factors tending to cause speed variations between the motors, especially during load variations, so that the wire feed often becomes irregular with resulting malfunction.

The present invention is concerned with the speed control of multiple servomotors in push-pull relation for feeding at a uniform selected rate flexible material such as welding wire, between two materially spaced stations.

SUMMARY OF THE INVENTION

In accordance with the invention in a preferred embodiment thereof, welding wire is passed to a welding gun from a comparatively remote supply reel by a feed-controlling pull motor at the welding gun, and at least one push motor located nearer the supply reel. The push motor is slaved to the master or pull motor by means of a velocity signal representing the speed of the pull motor and is regulated according to variation between this signal and a velocity signal representing the speed of the push motor itself. The pull (master) motor is controlled in response to polarized signals including velocity and torque feedback signals from the pull motor, and a selected wire speed or velocity reference signal. The resultant of these signals represents variation from the reference velocity, i.e. error, and is used in a time-ratio-control system with transistorized power switching for controlling application of power to the pull motor for speed regulation. A similar time-ratio-control system for the push motor is responsive to the speed variation signal mentioned above for controlling application of power to the slaved push motor. Both motors are protected from overload by respective torque feedback signals for reducing the switched power when load torque exceeds a safe reference value.

A principal object of the invention, therefore, is to provide an improved wire feed speed control system for multiple servo feed motors, wherein a selected rate of wire feed is uniformly maintained notwithstanding nonuniform feed conditions, including individual motor temperature characteristics.

Another object is to provide an improved feed control system of the character described above wherein a selected or reference wire feed rate is uniformly maintained by a coordinated pull motor and a velocity-slaved push motor.

A further object is to provide an improved wire feed speed control system that is efficient and reliable for maintaining without malfunction smooth and uninterrupted feed of welding wire to a welding gun from a comparatively remote supply reel, coincident with variations in servomotor loads, supply voltages and motor temperature and other characteristics.

A further related object is to provide an improved wire feed speed control system for synchronizing the speeds of the pull and push motors, wherein the pull motor is controlled for maintaining a constant speed characteristic according to combined signals representing respectively a reference wire speed, pull motor speed and pull motor torque, and the push motor is controlled according to combined signals representing respectively the master pull motor speed and the slaved push motor speed.

Other objects, features and advantages will appear from the following description with reference to the accompanying drawings.

BRIEF DESCRIPTION OF THE DRAWINGS

FIG. 1 is a flow-type diagram of an electrical speed control system for wire feed servomotors embodying the invention;

DESCRIPTION OF PREFERRED EMBODIMENT OF THE INVENTION

Figure 3:
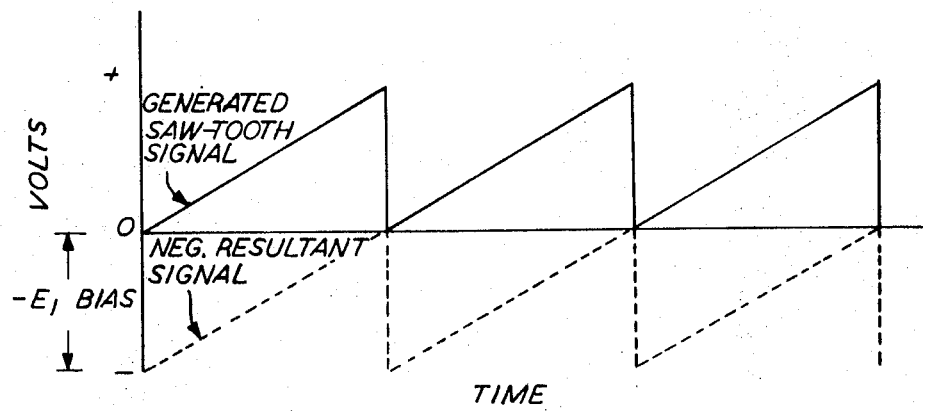

Referring to FIG. 1 of the drawings, welding wire W is fed from a supply reel 10 to a welding torch or gun generally indicated at 12, by a pull servomotor PLM located near or integrated with the welding gun, and a push servomotor PSM that is suitably located between the pull motor and the reel, the servomotors being as shown, arranged in tandem along the wire. Each motor drive includes conventional speed reduction gearing generally indicated at 14 that is in turn, connected to a driving roll 16 for passing wire from the reel 10 to the gun 12 between each driving roll and its friction-driven guide or idler roll 18. The servomotors are of conventional direct current type wherein the output torque is proportional to the input power current and preferably, although not necessarily, have similar characteristics. The pull motor has a typical drooping speed-torque characteristic and is controlled for establishing and maintaining the selected rate of wire feed, such as for example 200 in./min., and the push motor is slaved to the pull motor so that its speed is regulated primarily by the speed of the pull motor for ensuring synchronized wire feed in a uniform manner presently described.

Referring more specifically to the electrical control system for regulating the speeds of the respective servomotors, a speed or velocity reference signal $E_r$ representing the desired rate of wire feed, is derived from a potentiometer 20 that is energized by a suitable constant source of direct current $E_{dc}$, the reference voltage or signal being determined by the setting of the potentiometer slider 22. The reference signal $E_r$ is fed at 24 to the input network 26 of a high-gain regulating amplifier 28, together with a velocity signal $V_{PLM}$ at 30 representing the speed of the pull motor, and a torque signal $Q_{PLM}$ at 32 representing the pull motor load. These signals are derived respectively, as voltage feedback velocity and torque signals from the pull motor PLM. The input network signals, adjusted by conventional proportioning resistances and polarized as indicated, are algebraically summed to produce an error signal $x$ of small magnitude that is amplified by the high-gain amplifier 28 for producing a resultant control signal $G_x$ representing variation, or error, from the selected speed reference. The velocity feedback signal $V_{PLM}$ is readily obtained in known manner from the circuitry of the pull motor, etc., and the torque feedback signal may be suitably derived according to the input power current to the motor. Alternatively, the torque signal can if desired be derived in known manner from the mechanical output of the motor at the drive shaft.

Figure 2:
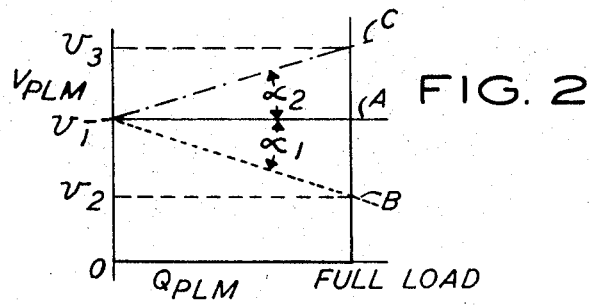
FIG. 2 is a speed-torque characteristic chart illustrating the control of the master pull motor of FIG. 1, and FIGS. 3, 4 and 5 graphically illustrate system control signals under different speed correction conditions.

As the objective is to achieve constant wire feed, the speed of the master motor PLM must be maintained constant, notwithstanding its normal characteristic tendency to drop off in speed with increase in load where a substantially constant voltage is applied to the motor armature. As diagrammatically shown by FIG. 2, the network input signals are related to the normal speed-torque characteristic curve of the assumed motor PLM for achieving a resultant constant speed-torque characteristic represented by line A, i.e. the ideal condition for a selected wire feed speed such as $v_1$, corresponding to the selected reference signal $E_r$. The normal motor characteristic for constant voltage supply, however, is shown by line B wherein the speed has dropped off to a value $v_2$ for the full-load condition.

For achieving the ideal condition wherein the motor speed remains constant at the value $v_1$, a signal of opposite polarity ($Q_{PLM}$) representing magnitude of minor torque at a given motor speed ($V_{PLM}$) is superimposed on the reference speed signal ($E_v$) that represents $v_1$ only for the no-load condition. The effect of the superimposed torque signal is to force a rising characteristic of the motor applied voltage as represented by line C. It will therefore be seen that if the motor PLM having a normal characteristic B is operated from the rising speed characteristic C, the resultant characteristic is indicated by line A, i.e. a constant speed ($v_1$) characteristic over the full range of load. The resultant characteristic is obtained empirically by first determining the normal characteristic droop angle $\alpha_1$ of the motor PLM; the rising characteristic angle $\alpha_2$ is made equal to $\alpha_1$, by proportioning of the oppositely polarized torque signal $Q_{PLM}$.

Referring back to the function of the input signal summing network 26, the absolute magnitude of the speed signal $V_{PLM}$ is equal to the summed magnitudes of the reference signal $E_v$ and the load torque signal $Q_{PLM}$ respectively, less the error signal $x$. Since the regulating system has very high gain, the error signal $x$ can be extremely small for control purposes. Accordingly, for normal operation the signal $V_{PLM}$ may be considered as equal in magnitude to the summation of the signals $E_v$ and $Q_{PLM}$.

The regulating high-gain amplifier output $G_x$ is used as the error signal for ultimately determining the input power voltage for the motor PLM, and to this end the signal is fed at 34 to a summing input network 36 of a time-ratio-control system of known type described below. The other network inputs include essentially a negative bias voltage $-E_1$ at 38 and a constant sawtooth voltage at 40. The sawtooth voltage of selected frequency is derived in usual manner from a sawtooth generator 42 energized by an oscillator OSC. The resultant of the algebraically summed signals, $\Sigma_1$, is a sawtooth voltage varying in amplitude according to the magnitude of the error signal $G_x$, i.e. the sawtooth voltage $\Sigma_1$ increases in magnitude with increase in $G_x$ as will be seen by reference to FIGS. 4 and 5, further described below. This sawtooth voltage of varying magnitude is fed to a so-called positive (+) detector 44 that limits the output to positive values, i.e. in excess of zero, and amplifies and converts positive sawtooth voltage pulses to spaced square waves as graphically indicated. The square wave output voltage still at sawtooth generator frequency, is fed to electronic transistorized switching circuitry of known type generally indicated at 46 and having a power source $E_P$ for supplying switched direct current to the motor PLM.

The transistorized pulse control and switching circuitry referred to above applies power to the motor PLM through conventional on-off pulse technique herein referred to as "time-ratio-control." Summarizing briefly the operation of the first pulse control stage, the positive (+) detector 44 senses and is responsive to positive $\Sigma_1$ input signals and amplifies these signals up to the limit of the comparatively low DC power supply (not shown) of the detector, i.e. the detector saturates up to the limit of its DC supply voltage. The time-spaced square wave pulses so produced are indicated by the conventional graph opposite the detector output. In the following control stage, the pulses are amplified in the transistorized switching unit 46 as indicated graphically at the output, i.e. the circuitry saturates (as in the positive detector) up to the limit of the main power supply voltage $E_p$, and the time-spaced pulses as amplified, represent the amount of power applied to the motor PLM.

FIG. 3 represents a transient condition at the input network 36 of detector 44 where $G_x$ is zero or less, due for example to a sudden decrease in torque with consequent increase in motor speed. Accordingly, as the negative bias $-E_1$ has been selected to match the maximum amplitude of the normal sawtooth voltage from generator 42, the resultant voltage $\Sigma_1$ is zero or less, the output of the positive detector 44 is zero, and minimum power at 46 is switched to the motor PLM. The motor speed accordingly drops back toward the reference speed until the readjusted speed and torque signals again represent a stabilized, reference speed condition.

Figure 4:
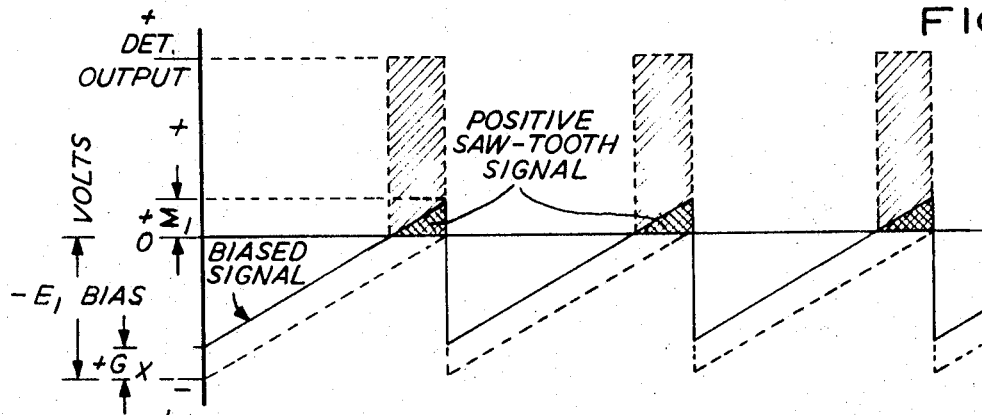

FIG. 4 represents a small $G_x$ error signal indicating a small transient drop in motor speed due to load increase, for example. In this instance, the combined positive $G_x$ and sawtooth voltages exceed the negative bias $-E_1$ by a small amount represented by $+\Sigma_1$ so that the detector output consists of comparatively narrow time-base square wave pulses that correspond in time-base width to the resultant sawtooth voltage, and in amplitude to the low DC voltage of the detector. These time-spaced square wave signals are amplified at the power switch 46 up to the limit of the main power supply $E_p$, and the comparatively low average correction voltage is applied to the motor PLM for the required increase in speed.

Figure 5:
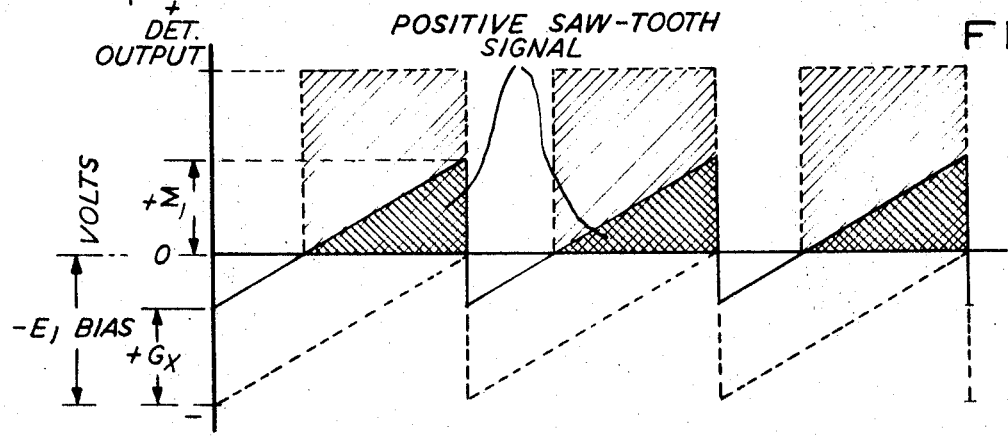

In FIG. 5, the $G_x$ signal is comparatively large indicating for example, greater load increase and material falloff in speed of the motor PLM. Here, the larger positive sawtooth pulses $\Sigma_1$ have comparatively broad time bases, thus establishing correspondingly broad time bases for the square wave pulses at the detector output. The further amplified square wave power pulses from the power switching unit therefore represent much greater average correction power, so that the speed of motor PLM is more positively brought back to the reference speed.

The amplified power output from the switching unit 46 is connected as indicated above, through a smoothing reactor or filter 48 and a load-sensitive resistance 50 to the motor PLM. The torque signal $Q_{PLM}$ is derived in known manner according to the current in the load sensitive resistance, i.e. the pull motor input current.

In case of excessive overload on motor PLM, the torque signal $Q_{PLM}$ is applied through a separate torque limiting circuit for reducing the positive detector input $\Sigma_1$ to zero or less, for minimum power to the motor. To this end, the actual torque signal $Q_{PLM}$ and an oppositely polarized signal $-e_1$ representing maximum allowable torque $Q_{PLM}$REF (torque reference) are matched and the difference is applied to the input network 52 of the positive detector 54. The detector input signal $\Sigma_2$ is therefore normally negative so that there is no output at the detector 54, and hence at the series-connected amplifier 56 that supplies the torque limiting signal at 41 to the positive detector 44. If, however, the actual motor torque should exceed the reference or maximum limit torque, the output of detector 54 is a positive signal that is fed to the torque limiting inverting amplifier 56. The inverted (negative) output signal at 41 accordingly reduces the detector input signal to zero or less, for reduced motor power. If this overload condition is transient and the motor torque drops back to its normal range, the torque limiting signal is removed in the manner described above and the normal operation of the system is resumed.

The slaved push motor PSM is energized through time-ratio-control circuitry that is essentially similar to the PLM circuitry, except that the speed or velocity reference signal is not constant; rather, it is variable according to transient variations in speed of the pull motor PLM. To this end the characteristic velocity signal $V_{PLM}$ from the pull motor feedback circuitry is used also as the speed reference voltage for the motor PSM. As the push motor PSM is velocity-slaved to the pull motor PLM, it follows that no torque feedback signal is used for its basic control.

Specifically, the push motor regulating input network 60 for the signal amplifier 62 has but two inputs, namely the master speed or velocity signal $V_{PLM}$ and the push motor velocity signal $V_{PSM}$ obtained by feedback. The input signals are oppositely polarized for obtaining a resultant or difference signal $x'$ that is amplified in the inverting high-gain amplifier 62 for producing an error signal $G'_x$. This signal, together with the sawtooth voltage from generator 42 and a bias voltage $-E_2$, constitute the inputs of the summing network 64 for the positive detector 66 during normal operation. The resultant signal $\Sigma_3$ (normally greater than zero) is processed at the positive detector 66 and power switching unit 68 in the manner above described for producing time-spaced power pulses of square wave form that are averaged at the filter 70 for constituting the DC correction power input to the motor PSM. It will be apparent from the previous description that as the constant speed reference signal $V_{PLM}$ is continuously compared with the actual push motor speed signal, $V_{PSM}$, the resulting error signal $G'_x$ tends to maintain the speed of push motor PSM in conformity with the signal $V_{PLM}$, i.e. the speed of the pull motor.

For overload torque control, a torque feedback signal is used in the manner of the pull motor overload torque system for reducing power to the motor PSM when its torque exceeds a predetermined safe maximum. The actual push motor torque signal $Q_{PSM}$ is derived from the load sensitive resistance 72 and is compared at the detector input network 74 with a reference or maximum torque signal $-e_2$ representing $Q_{PSM1REF}$. The resultant signal $\Sigma_4$, normally less than zero, is fed as above described to the positive detector 76 and thence to the torque limiting amplifier 78. The output (overload) signal, now inverted, appears as a negative voltage at the input network 64 of the detector 66. Accordingly, when an overload signal appears at the network 64 from the torque limiting amplifier, the resultant network signal $\Sigma_3$ for the detector 66 becomes negative; the push motor power is therefore reduced for preventing overloading.

In an experimental system embodying the invention, it was found that notwithstanding wide load variations, the speed of the master motor PLM varied with respect to the selected speed reference voltage $E_v$ within a limited range of but one-half percent to 2 percent. Speed variations between the motors PLM and PSM during operation between minimum load and high loads involving extreme conditions, were practically negligible aside from momentary transient corrections. Accordingly, only wire feed load can vary between the pull and push motors. Load variations may be due to various factors such as manipulation of the gun by the welder, weld metal spatter and/or wear of the contact tube and casing, and power source fluctuations. It will therefore be seen from the above that the rate of wire feed is affected only in transient manner by any one or a combination of such load conditions.

Although but a single push motor is used in the preferred embodiment described above, it is within the scope of the invention to use two or more push motors for facilitating uniform wire feed, especially where the supply reel is located a considerable distance from the welding gun. In this instance, the push motors are located at suitable points along the feed wire, and are simultaneously controlled from the single master motor PLM; i.e., each push motor is separately slaved to the master pull motor $V_{PLM}$ speed signal.

Having set forth the invention in what is considered to be the best embodiment thereof, it will be understood that changes may be made in the system and apparatus as above set forth without departing from the spirit of the invention or exceeding the scope thereof as defined in the following claims; it will also be understood that language relating to the respective locations of the "pull motor" and "push motor" as used in the claims, is intended to indicate but generally the precise positions of the feed motors in practice. For example, the expression "pull motor located at the welding unit" is intended to mean that the pull motor can be structurally incorporated in the welding unit, or located adjacent to or sufficiently near the welding unit (or station) for positive wire feed, depending on the size and weight of the motor, stiffness of welding wire and guide tube characteristics and similar practical considerations.

I claim:

1. In a push-pull wire feed system for supplying welding wire from a wire supply station to a welding station, and having a plurality of direct current wire feed motors in tandem including at least one push motor located along the wire intermediate the stations, and a pull motor having a drooping speed-torque characteristic located at the welding station, the method of controlling the speed of the wire feed motors for uniform wire feed that comprises comparing control quantities representing the speed and load torque respectively of the pull motor with a control quantity representing a selected reference wire feed speed for obtaining a motor control quantity representing deviation of the pull motor speed from the reference speed, applying power to the pull motor according to the parameters of the motor control quantity for correcting speed deviations and maintaining the pull motor at reference speed throughout the normal range of load torque, and slaving the speed of the push motor to that of the pull motor.

2. The method of wire feed speed control as specified in claim 1 wherein the control quantities are voltage signals and the pull motor speed and torque signals respectively, are of opposite sense and proportioned for compensating the drooping speed-torque characteristic of the pull motor.

3. The method of wire feed speed control as specified in claim 2 wherein the sum of the magnitudes of the speed reference signal and the pull motor torque signal is normally substantially equal to the magnitude of the pull motor speed signal.

4. The method of wire feed speed control as specified in claim 1 and including the steps:
   a. deriving a signal representing a selected reference speed for the wire feed,
   b. deriving a signal representing the instant speed of the pull motor,
   c. deriving a signal representing the instant load torque of the pull motor,
   d. comparing all the derived signals for obtaining an error signal representing deviation of pull motor speed from the reference speed,
   e. applying power to the pull motor according to the magnitude and sense of the error signal for correcting speed deviations and maintaining the pull motor speed at reference speed,
   f. deriving a signal representing the instant speed of the push motor,
   g. comparing the push motor speed signal with the pull motor speed signal for deriving a second error signal representing deviation of the push motor speed from the pull motor speed,
   h. applying power to the push motor according to the magnitude and sense of the second error signal for correcting the speed deviations and maintaining the push motor speed at the pull motor speed.

5. Apparatus for controlling the speed of a plurality of wire feed motors for feeding in a push-pull arrangement a welding wire at a uniform rate from a supply source to a welding unit, the feed motors including a pull motor having a drooping speed-torque characteristic located at the welding unit and at least one push motor located between the unit and the wire supply, comprising:
   a. means for controlling application of power to the pull motor,
   b. means for deriving a constant reference signal representing a selected wire feed speed,
   c. means for deriving a pair of control signals representing respectively, the speed and the load torque of the pull motor,
   d. the pull motor power controlling means being responsive to the reference and control signals jointly for applying power to the pull motor in amount sufficient to maintain its speed at the selected wire feed speed,
   e. and means operable according to the speed of the pull motor for slaving the speed of the push motor to that of the pull motor.

6. Apparatus as specified in claim 5 wherein comparing means for the reference and control signals produce an error signal representing deviation of the pull motor speed from the selected reference speed, and the pull motor power controlling means is activated according to a function of the error signal.

7. Apparatus as specified in claim 6 wherein the comparing means constitutes a summing input network for a high-gain regulating amplifier, and the error signal output of the amplifier is pulse-modulated and polarized for activating the power controlling means.

8. Apparatus as specified in claim 7, wherein the power controlling means constitutes transistorized switching means that is responsive to the magnitude of the polarized error signal for applying power pulses of corresponding duration to the pull motor.

9. Apparatus as specified in claim 5 wherein the power controlling means for the pull motor constitutes on-off switching means for applying power pulses of variable duration for maintaining the motor at the selected wire feed speed.

10. Apparatus as specified in claim 9, wherein the duration of the power pulses is controlled according to the magnitude of the error signal.

11. Apparatus as specified in claim 5 wherein the pull motor load torque signal is compared with a torque reference signal representing maximum permissible pull motor load for producing a torque limiting signal upon overload, and the overload signal overrides the reference and control signals for reducing application of power to the pull motor.

12. Apparatus as specified in claim 5 wherein the push motor is energized by separate application of power for maintaining the push motor speed at the pull motor speed, and a signal representing the push motor load torque is compared with a reference signal representing maximum permissible push motor load for producing a torque limiting signal upon overload, and the overload signal overrides the speed slaving means for reducing application of power to the push motor.

13. Apparatus as specified in claim 5 wherein the wire speed reference signal and the speed and torque control signals are relatively proportioned and polarized for jointly causing application of power to the pull motor throughout its normal load range for establishing therefor a constant speed-torque characteristic.

UNITED STATES PATENT OFFICE
CERTIFICATE OF CORRECTION

Patent No. 3,586,222                     Dated June 22, 1971

Inventor(s) Marvin Rosen

It is certified that error appears in the above-identified patent and that said Letters Patent are hereby corrected as shown below:

In the Abstract, line 10 "comprising" should be --comparing--
Column 1, line 6, after "copending" insert -- U.S.--
Column 4, line 7, after the quotation marks remove the minus sign
Column 5, line 48, the "QPSM1REF" should be --$Q_{PSM}$-REF Signed and sealed this 30th day of November 1971.

(SEAL)
Attest:

EDWARD M. FLETCHER, JR.          ROBERT GOTTSCHALK
Attesting Officer                Acting Commissioner of Patents

FORM PO-1050 (10-69)